United States Patent Office 3,390,193
Patented June 25, 1968

3,390,193
METHOD OF MAKING ETHYLIDENE-1-CYCLOHEXENES
Leonard C. Kreider, Wadsworth, Ohio, assignor to Goodrich-Gulf Chemicals, Inc., Cleveland, Ohio, a corporation of Delaware
No Drawing. Filed Dec. 27, 1965, Ser. No. 516,668
24 Claims. (Cl. 260—666)

ABSTRACT OF THE DISCLOSURE

This invention relates to the manufacture of ethylidene-1-cyclohexenes and more particularly to a new and improved process for making 3-ethylidene-1-cyclohexene and/or 4-ethylidene-1-cyclohexene by the isomerization of 4-vinyl-1-cyclohexene in the presence of a reactant which is either tri-4-ethyl-1-cyclohexene aluminum or tri-alkyl-aluminum and a colloidal nickel catalyst at a temperature of from 75° to 150° C.

---

The general object of this invention is to provide a new and improved process for making 3-ethylidene-1-cyclohexene and/or 4-ethylidene-1-cyclohexene.

Another object of this invention is to provide a new and improved process for making isomerization products of 4-vinyl-1-cyclohexene and for making 3-ethylidene-1-cyclohexene and 4-ethylidene-1-cyclohexene.

Still other objects of this invention include the provision of a new and improved process for making 3-ethylidene-1-cyclohexene and 4-ethylidene-1-cyclohexene by the isomerization of 4-vinyl-1-cyclohexene which is efficient and effective in use and practice; which obtains an optimum yield of the desired isomer with a minimum of contaminants; which is commercially practical; which admits of separation of the newly formed 3-ethylidene-1-cyclohexene and/or 4-ethylidene-1-cyclohexene from concurrently formed by-products by fractional distillation under vacuum; which is practical for commercial production; which obtains an unexpectedly high and unobvious yield of 3-ethylidene-1-cyclohexene; and which provides a 3-ethylidene-1-cyclohexene suitable for use as an intermediary for polymers and a monomer for copolymers.

A still further object of this invention is to provide a new and improved process for making 3-ethylidene-1-cyclohexene and/or 4-ethylidene-1-cyclohexene obtaining one or more of the objects set forth above.

These and other objects and advantages of this invention will appear from the following description of preferred forms thereof.

Briefly the process embodying this invention comprises heating 4-vinyl-1-cyclohexene and tri-isobutyl aluminum together, in the presence of a nickel catalyst, preferably at a temperature of 125° to 150° C., for several hours, until reaction is completed to the extent desired, and then fractionally distilling the resultant mixture, under vacuum, to separate out 3-ethylidene-1-cyclohexene and/or 4-ethylidene-1-cyclohexene, thus produced, as desired, from the by-products and other substances contained in the reaction mixture.

Isobutylene, or other olefin known to readily interchange with hydrocarbon groups attached to aluminum, is, also, preferably included in the original reactant mixture in order to improve the reaction time and conditions and the percentage and quality of the yield. The isobutylene may be added as a separate reactant initially, or formed in situ from the reactants used.

In another form of the invention tri-4-ethyl-1-cyclohexene aluminum, 4-vinyl-1-cyclohexene and colloidal nickel (preferably with isobutylene, as, to and for the purpose set forth above) are reacted together by heating for several hours, preferably at from 125° to 150° C., and the reaction mixture is then fractionally distilled, under vacuum, to obtain the ethylidene-1-cyclohexenes thus produced, as desired.

Further, while the reactants set forth above are preferred, the process of this invention may be accomplished with other tri-alkyl aluminums, such as tri-ethyl aluminum, tri-propyl aluminum and tri-pentyl aluminum, but superior results are obtained with tri-isobutyl aluminum. Also the nickel catalyst may be of any convenient colloidal form or of a compound which reduces to give colloidal nickel, such as, nickel acetyl acetonate which so reduces in the presence of tri-isobutyl aluminum.

The reaction is conveniently stopped, when the desired conversion is obtained, by quenching the reaction mixture, and, more particularly, the colloidal nickel catalyst, with alcohol or any other convenient substance having a reactive hydrogen content.

No solvent is required for the preferred form of the invention and the pressures necessary for the conversion are autogenously obtained by carrying out the reaction in a pressurized reaction vessel or bomb, since certain of the reactants are volatile at the preferred temperature range of 125°–150° C.

The preferred nature of the unobvious temperature range over which the process of this invention is effective and practical obtains from the fact that the conversion to 3-ethylidene-1-cyclohexene is too slow at temperatures below 125° C. and the yield of by-products is unreasonably and unnecessarily increased at temperatures above 150° C. Thus the maximum desirable yield of 3-ethylidene-1-cyclohexene, vis-a-vis by-products, in a reasonable and realistic reaction time requires a reaction temperature of 125° to 150° C.

During fractional distillation of the reaction mixture, after further conversion is quenched, the isobutylene, if used, comprises the lower or first fraction, 4-vinyl-1-cyclohexene the next or second fraction, 4-ethylidene-1-cyclohexene, which boils at 79° C. at 100 mm. pressure absolute, the third fraction and 3-ethylidene-1-cyclohexene, which boils at 85.2° C. at 100 mm. pressure absolute, the fourth fraction, or one or more adjacent boiling reactant products may be taken off as a single fraction, if desired.

Example I 75 grams (.38 mole) of tri-isobutyl aluminum were reacted together with 592 grams (5.5 moles) of 4-vinyl-1-cyclohexene in the presence of .25 gram of nickel acetyl acetonate for eight hours at 150° C. No isobutylene was added to the reaction mixture but 1.14 moles were formed in situ so that the molar ratio of reactant was 1.00 mole of tri-isobutyl aluminum to 14.6 moles of 4-vinyl-1-cyclohexene to 3 moles of isobutylene. The reaction mixture was then fractionally distilled, under vacuum with the recovery of 393 grams of 4-vinyl-1-cyclohexene isomers and related products including 232 grams of 3-ethylidene-1-cyclohexene, 92 grams of 4-ethylidene-1-cyclohexene and 31 grams of 4-vinyl-1-cyclohexene.

Example II 24 grams (0.068 mole) of tri-4-ethyl-cyclohexene aluminum were reacted together with 85 grams (0.79 mole) of 4-vinyl-1-cyclohexene and 25 grams (0.45 mole) of isobutylene in the presence of .25 gram of nickel acetyl acetonate for two hours at 75° C. and then for 2 more hours at 125° C.

An aliquot portion of the reaction mixture was withdrawn after two hours and both that portion and the final reaction mixture were fractionally distilled, under vacuum, to recover 3 - ethylidene - 1 - cyclohexene, which comprised 17.9% of the mixture resulting from two hours heating at 75° C. and 53.9% of the mixture resulting from 2 additional hours of heating at 125° C.

The balance of the mixtures were respectively 12.7% and 28.5% 4-ethylidene-1-cyclohexene, 37.8% and 11.4% 4-vinyl-1-cyclohexene and 1.6% and 6.2% other products.

These examples indicate that the process of this invention first converts the 4-vinyl-1-cyclohexene to 4-ethylidene-1-cyclohexene and that this rearranges, upon further heating and treatment in the reaction vessel, to give 3-ethylidene-1-cyclohexene. Thus the amounts and relative amounts of 3- and 4-ethylidene-1-cyclohexene obtained can be controlled and regulated by the temperature and time at and for which the reaction is carried out, but unexpectedly high yields of the 3-ethylidene-1-cyclohexene are obtained in a relatively short and expeditious time when the reaction temperature is at from about 125° C. to 150° C.

Modifications, changes and improvements to the forms of the inventon herein particularly disclosed and described may occur to those skilled in the art who come to understand the principles and precepts thereof. Accordingly, the scope of the patent issued hereon should not be limited to the specific forms of the invention herein particularly disclosed and described but only consistent with the advance by which the invention has promoted the art.

I claim:

1. A process for making a mixture of 3- and 4-ethylidene-1-cyclohexenes by the isomerization of 4-vinyl-1-cyclohexene comprising the step of contacting a feed consisting essentially of 4-vinyl-1-cyclohexene with a nickel isomerization catalyst and a reactant chosen from the group consisting of (a) tri-alkyl aluminum (b) tri-alkyl aluminum and an olefin and (c) tri-4-ethyl-1-cyclohexene aluminum and an olefin, said olefin is known to readily interchange with hydrocarbon groups attached to aluminum, at a temperature of from 75° C. to 150° C. until the desired conversion is completed.

2. The process according to claim 1 in which said olefin reactant is isobutylene.

3. The process according to claim 1 in which said nickel isomerization catalyst is formed from added nickel acetyl acetonate.

4. The process according to claim 1 in which said tri-alkyl aluminum is tri-isobutyl aluminum.

5. The process according to claim 4 in which said olefin is isobutylene.

6. The process according to claim 1 carried out under autogenous pressure in a closed reaction vessel.

7. The process according to claim 1 with the additional step of fractionally distilling the reaction mixture to separate out the ethylidene-1-cyclohexenes.

8. The process according to claim 7 with the additional step of quenching said reaction upon completion of said conversion with means providing reactive hydrogen.

9. The process according to claim 8 in which said last named means is alcohol.

10. The process according to claim 7 in which 4-ethylidene-1-cyclohexene is recovered from said distillation step.

11. The process according to claim 7 in which 3-ethylidene-1-cyclohexene is recovered from said distillation step.

12. A process for making 3-ethylidene-1-cyclohexene by the isomerization of 4-vinyl-1-cyclohexene comprising the step of contacting a feed consisting essentially of 4-vinyl-1-cyclohexene with a nickel isomerization catalyst and a reactant chosen from the group consisting of (a) tri-alkyl aluminum (b) tri-alkyl aluminum and an olefin and (c) tri-4-ethyl-1-cyclohexene aluminum and an olefin, said olefin is known to readily interchange with hydrocarbon groups attached to aluminum, at a temperature of from 125° C. to 150° C. until the desired conversion is completed.

13. The process according to claim 12 in which said olefin reactant is isobutylene.

14. The process according to claim 12 in which said nickel isomerization catalyst is formed from an added compound which reduces to form colloidal nickel.

15. The process according to claim 12 in which said tri-alkyl aluminum is tri-isobutyl aluminum.

16. The process according to claim 15 in which said olefin is isobutylene.

17. The process according to claim 16 carried out under autogenous pressure in a closed reaction vessel.

18. The process according to claim 16 with the additional step of fractionally distilling the reaction mixture to separate out the 3-ethylidene-1-cyclohexene.

19. The process according to claim 18 in which said distillation is accomplished under vacuum.

20. The process according to claim 16 in which said reactant mixture comprises 1 mole of tri-isobutyl aluminum, 3 to 15 moles of 4-vinyl-1-cyclohexene, 3 moles of isobutylene and catalytic nickel in the amount of ½ gram per kilogram of reactants.

21. The process according to claim 20 with the additional step of quenching said reaction upon completion of said conversion with means providing reactive hydrogen.

22. The process according to claim 20 in which said named means is alcohol.

23. The process according to claim 20 in which said reactant mixture is heated for about 3 to 8 hours.

24. The process according to claim 16 in which said nickel isomerization catalyst is formed from added nickel acetyl acetonate.

References Cited

UNITED STATES PATENTS

| | | | |
|---|---|---|---|
| 2,964,574 | 12/1960 | Withe | 260—666 |
| 2,978,523 | 4/1961 | Coyne | 260—683.15 |
| 3,080,432 | 3/1963 | Voltz et al. | 260—111 |
| 3,154,594 | 10/1964 | Levine | 260—666 |
| 3,157,708 | 11/1964 | Munley | 260—666 |
| 3,247,270 | 4/1966 | Kirk | 260—666 |
| 3,306,948 | 2/1967 | Kealy | 260—666 |
| 3,309,410 | 3/1967 | Schnesheim et al. | 260—666 |
| 3,313,858 | 4/1967 | Clark et al. | 260—666 |
| 3,320,326 | 5/1967 | Bloch | 260—666 |
| 3,340,317 | 9/1967 | Kewton | 260—666 |

DELBERT E. GANTZ, *Primary Examiner.*

V. O'KEEFE, *Assistant Examiner.*